(12) United States Patent
Huang et al.

(10) Patent No.: US 11,880,428 B2
(45) Date of Patent: Jan. 23, 2024

(54) METHODS AND SYSTEMS FOR UPDATING PERCEPTION MODELS BASED ON GEOLOCATION FEATURES

(71) Applicant: Toyota Motor Engineering & Manufacturing North America, Inc., Plano, TX (US)

(72) Inventors: Siqi Huang, Charlotte, NC (US); Haoxin Wang, Charlotte, NC (US); Akila C. Ganlath, Agua Dulce, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 146 days.

(21) Appl. No.: 17/525,129

(22) Filed: Nov. 12, 2021

(65) Prior Publication Data
US 2023/0153378 A1    May 18, 2023

(51) Int. Cl.
*G06F 18/21*    (2023.01)
*G06V 20/56*    (2022.01)

(52) U.S. Cl.
CPC ............. *G06F 18/21* (2023.01); *G06V 20/56* (2022.01)

(58) Field of Classification Search
CPC ................................ G06F 18/21; G06V 20/56
See application file for complete search history.

(56) References Cited

U.S. PATENT DOCUMENTS

| | | | |
|---|---|---|---|
| 10,486,485 | B1 | 11/2019 | Levinson et al. |
| 2017/0142194 | A1* | 5/2017 | Bolshakov ............ H04L 67/568 |
| 2017/0185873 | A1* | 6/2017 | Wang ..................... G10L 15/063 |
| 2018/0349785 | A1* | 12/2018 | Zheng ................... G06F 18/251 |
| 2020/0226430 | A1 | 7/2020 | Ahuja et al. |
| 2020/0257317 | A1 | 8/2020 | Musk et al. |
| 2020/0272854 | A1 | 8/2020 | Caesar |
| 2021/0081826 | A1* | 3/2021 | Javaid ..................... G06N 5/045 |
| 2021/0156704 | A1 | 5/2021 | Gibson et al. |
| 2021/0163021 | A1 | 6/2021 | Frazzoli et al. |
| 2023/0058269 | A1* | 2/2023 | Singh ..................... G06N 20/00 |

FOREIGN PATENT DOCUMENTS

EP    3629059 A1    4/2020

* cited by examiner

*Primary Examiner* — David Perlman
(74) *Attorney, Agent, or Firm* — Dinsmore & Shohl LLP

(57) ABSTRACT

A server includes a controller programmed to obtain information about a first perception model installed in a vehicle. The controller is further programmed to determine a value of updating the first perception model. The controller is further programmed to determine whether the first perception model needs to be updated to a second perception model based on the value of updating the first perception model. The controller is further programmed to transmit the second perception model to the vehicle in response to determining that the first perception model needs to be updated to the second perception model.

16 Claims, 7 Drawing Sheets

METHODS AND SYSTEMS FOR UPDATING PERCEPTION MODELS BASED ON GEOLOCATION FEATURES

TECHNICAL FIELD

The present specification generally relates to apparatus and methods for selecting a perception model based on geolocation features.

BACKGROUND

Vehicles utilize perception models for detecting and tracking objects. By detecting and tracking objects, the vehicle may avoid collisions of the vehicle with the objects. Vehicles may have different perception models based on the environment of the vehicle. However, vehicles have limited computational resources, which may require for perception models to be compressed to handle a detecting a large number of varying objects. This may result in degradation of the perception models, which causes operation concerns. Alternatively, perception models may also be updated based on the vehicle's location. However, the vehicle's location may change in a rapid manner and may not provide an accurate perception model based on the vehicle's environment.

Accordingly, a need exists for systems and methods that update perception models based on the environment of the vehicle in a timely and accurate manner.

SUMMARY

In one embodiment, apparatus including a server. The server includes a controller programmed to obtain information about a first perception model installed in a vehicle. The controller is further programmed to determine a value of updating the first perception model. The controller is further programmed to determine whether the first perception model needs to be updated to a second perception model based on the value of updating the first perception model. The controller is further programmed to transmit the second perception model to the vehicle in response to determining that the first perception model needs to be updated to the second perception model.

In another embodiment, a method performed by a controller includes obtaining information about a first perception model installed in a vehicle. The method further includes determining a value of updating the first perception model. The method further includes determining whether the first perception model needs to be updated to a second perception model based on the value of updating the first perception model. The method further includes transmitting the second perception model to the vehicle in response to determining that the first perception model needs to be updated to the second perception model In yet another embodiment, apparatus for a vehicle which includes a controller. The controller is programmed to collect information about a first perception model of the vehicle. The controller is further programmed to transmit the information about the first perception model to a server. The controller is further programmed to receive a second perception model generated based on a value of updating the first perception model. The controller is further programmed to update the first perception model to the second perception model. The controller is further programmed to offload a perception task to the server while updating the first perception model to the second perception model.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include systems and methods for detecting an environment and then updating a perception model for vehicle based on the environment. Updating perception models may be limited by the computational resources of the vehicle. Conventional systems may compress advanced perception models for the vehicle, which may cause degradation of the perception models. Accordingly, it is often required for perception models to be updated based on varying scenarios for the vehicle. Additionally, vehicles are constantly changing their location which may cause updating to be limited by the vehicle's network connectivity. These problems may result in concerns, such as poor object detection. The present disclosure analyzes geolocation-based features of the vehicle's environment to determine an appropriate perception model. This results in providing the vehicle an accurate perception model in a timely manner.

Figure 1:
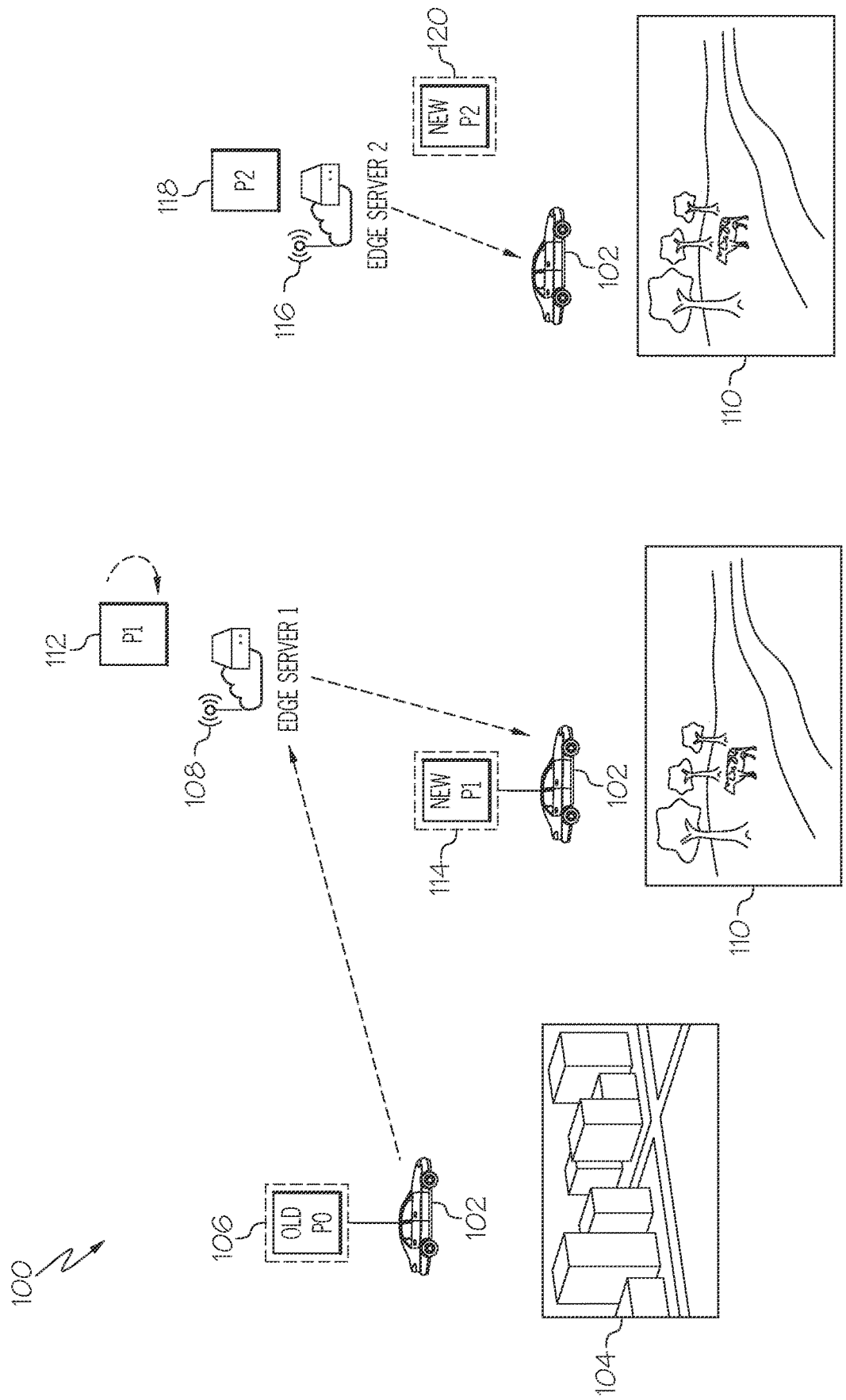
FIG. 1 schematically depicts a system for detecting an environment based on geolocation-based features, according to one or more embodiments shown and described herein.

FIG. 1 schematically depicts a system 100 for detecting an environment based on geolocation-based features, according to one or more embodiments shown and described herein.

Referring to FIG. 1, a vehicle 102 is shown traveling through a city environment 104 (e.g., industrial environment). The vehicle 102 may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The vehicle 102 executes a first perception model 106 that is installed in the vehicle 102. The first perception model 106 is used for the detection and tracking of dynamic traffic objects (e.g., a set of objects) surrounding the vehicle 102. A few examples of these dynamic traffic objects include pedestrians, other vehicles, cyclists, animals, moving debris, moving rocks, fallen snow, and the like. For example, when in the city environment 104, the first perception model 106 is trained to detect cyclists surrounding the vehicle 102. Due to the close proximity of vehicles and cyclists in the city environment 104, the first perception model 106 may be trained to not alert the driver when a cyclist is closer to the vehicle in the city environment 104 as compared to another environment. The first perception model 106 may be further trained to track the trajectory of the cyclist to mitigate a chance of a potential collision between the vehicle 102 and the cyclist.

The first perception model 106 may also alter a digital map presented to the driver of the vehicle 102 indicative of the vehicle's surrounding. For example, in the city environment 104, the first perception model 106 may alter the digital map, such that elements indicative of the city environment 104 (e.g., skyscrapers, pedestrian cross-walks, narrow roads) are reflected in the digital map.

The city environment 104 shown in FIG. 1 depicts a single environment for ease of depiction and should not be construed to limit the first perception model 106 to the city environment 104. The environment of the vehicle 102 may include, but is not limited to, a countryside, a highway, a mountainside, a forest preserve, a desert, a tundra, a farm, a grassland, a coastline, or the like.

Additionally the environment of the vehicle 102 may be based on the weather information and/or time information (e.g., the time of day). For example, there may be varying perception models based on a forest preserve without rain during the day and a forest preserve while rain during the night. Additionally, the environment of the vehicle 102 may be based on traffic incident information. For example, if it detected that an accident has occurred, the perception model may detect for vehicle debris, abnormal vehicle driving behavior, emergency vehicle, and the like. Additionally, the environment of the vehicle 102 may be based on natural disaster information. For example, if a tornado has occurred, the perception model may detect for objects traveling having abnormal trajectories.

The vehicle 102 is communicatively coupled to a network server, such as a first edge server 108. The first edge server 108 facilitates for data to be downloaded by the vehicle 102 from the first edge server 108. For example, the first perception model 106 may be downloaded to the vehicle 102 from the first edge server 108, in response to the vehicle 102 entering the city environment 104. The vehicle 102 also provides data to the first edge server 108, such as geolocation-based features, geolocation, and the like. Additionally, the first edge server 108 facilitates for the vehicle 102 to communicate with other vehicles communicatively coupled to the first edge server 108. For example, if the vehicle 102 is in proximity to another vehicle, data from the vehicle 102 and the other vehicle may be shared to each other via the first edge server 108. The first edge server 108 may use the data from the vehicle 102 and the other vehicle to determine an environment of the vehicle 102 and the other vehicle collectively.

The vehicle 102 includes one or more sensors positioned around the vehicle 102. As discussed in greater detail herein, the one or more sensors may be any device having an array of sensing devices capable of detecting radiation in an ultraviolet wavelength band, a visible light wavelength band, or an infrared wavelength band. As also discussed in greater detail herein, the one or more sensors may further include motion sensors to detect and track motion around the vehicle 102. In embodiments described herein, the one or more sensors may provide image data to the first edge server 108.

The one or more sensors are configured to detect geolocation-based features around the vehicle 102. As discussed in greater detail herein, the geolocation-based features are then used to determine the type of environment surrounding the vehicle 102. The perception model for the vehicle 102 may then be updated based on the environment of the vehicle 102. For example, while the vehicle 102 travels through the city environment 104, the one or more sensors continue to detect geolocation-based features to determine if the vehicle 102 continues to be in the city environment 104. For example, in the city environment 104, the one or more sensors detect for road layouts indicative of a city environment, cross-walk layouts indicative of a city environment, sky-scrapers, driving style of adjacent vehicles, and the like. The one or more sensors may provide these geolocation-based features to a processor of the vehicle 102 and/or to the first edge server 108. As discussed in greater detail herein, the processor of the vehicle 102 and/or the first edge server 108 determine if the vehicle 102 continues to be within the city environment 104. If the vehicle 102 is still within the city environment 104, the first perception model 106 remains to be executed by the processor of the vehicle 102. If the vehicle is no longer within the city environment 104, the processor of the vehicle 102 and/or the first edge server 108 determine whether to change the perception model of the vehicle 102.

Continuing in FIG. 1, the vehicle 102 is shown traveling from the city environment 104 to a countryside environment 110. While traveling, the one or more sensors of the vehicle 102 continue to detect geolocation-based features of the environment of the vehicle 102. The one or more sensors provide the data to the processor of the vehicle 102 and/or to the first edge server 108. As discussed in greater detail herein, the processor of the vehicle 102 and/or the first edge server 108 make a determination as to whether the perception model of the vehicle 102 should be changed.

As depicted in FIG. 1, it is determined that first perception model 106 should be updated to a second perception model 114. The vehicle 102 offloads (e.g., transfers processing) processing the data received by the one or more sensors to the first edge server 108. The vehicle 102 may also provide a user profile of the driver (e.g., driver preferences, driving profile, vehicle type, vehicle processing capabilities) to the first edge server 108.

After determining to update the perception model, the first edge server 108 prepares a network perception model 112. The network perception model 112 is a perception model determined by the first edge server 108 that is indicative of the environment of the vehicle 102. As depicted in FIG. 1, the vehicle 102 is now in the countryside environment 110. Accordingly, the network perception model 112 is associated with one for the countryside environment 110. For example, the network perception model 112 may include farm animals as objects to be detected by the second perception model 114. As discussed in greater detail herein, the first edge server 108 determines a strength of the network signal between the first edge server 108 and the vehicle 102 and optimizes the network perception model 112 based on the network signal strength. For example, if the vehicle 102 is stationary and is connected to a stable WiFi connection, the first edge server 108 may optimize the network perception model 112 to contain the entirety of class objects associated with the countryside environment 110. In another example, if the vehicle is moving and has a poor connection to the first edge server 108, the first edge server 108 may optimize the network perception model 112 to contain the more important class objects associated with the countryside environment 110.

The first edge server 108 may then provide the network perception model 112 to the vehicle 102. The first edge server 108 may provide the network perception model 112 in a compressed package or individual packages to the vehicle 102. When providing the individual packages to the vehicle 102, the first edge server 108 may further prioritize the class objects to first provide the vehicle 102. In embodiments, the first edge server 108 may first provide the class objects associated with the countryside environment 110 and then update the digital map for the driver, or vice versa.

The vehicle 102 updates the perception model from the first perception model 106 to the second perception model 114. In embodiments, the second perception model 114 is substantially similar to the network perception model 112. In embodiments, the second perception model 114 is a compressed version of the network perception model 112. In embodiments, the second perception model 114 may additionally include driver information when compared to the network perception model 112.

As the vehicle 102 continues to travel in the countryside environment 110, it may transition from being communicatively coupled to the first edge server 108 to now be communicatively coupled to a second edge server 116. In embodiments, the vehicle 102 may be communicatively coupled to both the first edge server 108 and the second edge server 116. The second edge server 116 may define a stronger connection signal to the vehicle 102 when compared to the first edge server 108. In these embodiments, the second edge server 116 may determine to update the perception model of the vehicle 102 to have additional class objects for the countryside environment 110. The second edge server 116 may prepare an updated network perception model 118 to replace or supplement the second perception model 114. The second edge server 116 may provide the updated network perception model 118 in a substantially similar manner described above relating to the first edge server 108 providing the network perception model 112 to the vehicle 102.

The vehicle 102 updates the perception model from the second perception model 114 to a third perception model 120. The updated network perception model 118 may have the same relationship with the third perception model 120 as described above in regards to the relationship between the network perception model 112 and the second perception model 114.

Figure 2:
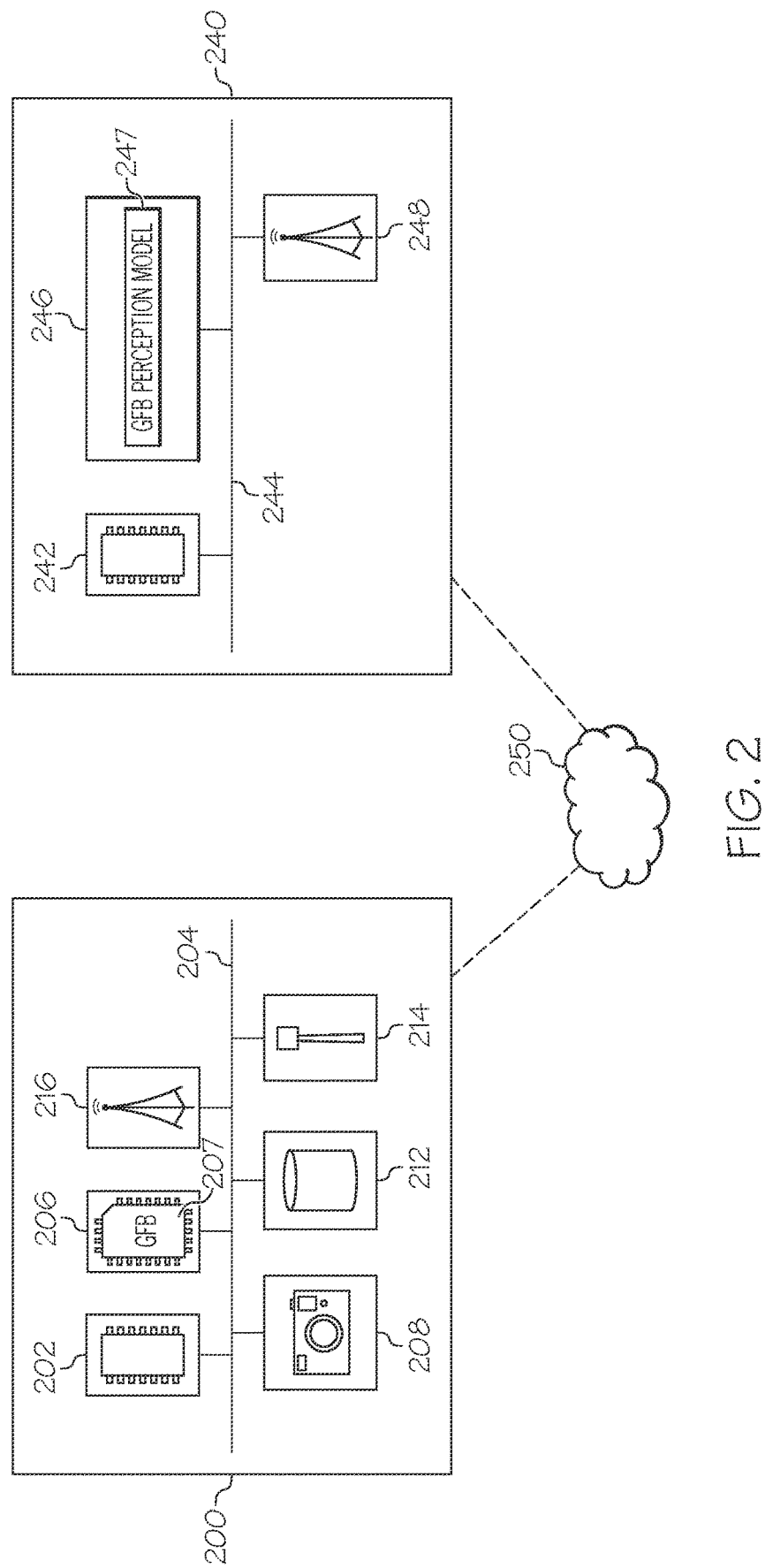
FIG. 2 depicts a schematic diagram for a system that detects an environment using geolocation-based features, according to one or more embodiments shown and described herein.

FIG. 2 depicts a schematic diagram for a system 200 that detects an environment using geolocation-based features, according to one or more embodiments shown and described herein.

The system includes a vehicle system 200, an edge system 240, and a network 250. While FIG. 2 depicts a single vehicle system, it is noted that more than one vehicle system may communicate with the edge system 240. It is also noted that, while the vehicle system 200 and the edge system 240 are depicted in isolation, the edge system 240 may be included within the vehicle 102 of FIG. 1. Alternatively, the edge system 240 may be included within an edge server or a road side unit (RSU) that communicates with the vehicle 102. In embodiments in which the vehicle system 200 is included within an edge node, the edge node may be an automobile or any other passenger or non-passenger vehicle such as, for example, a terrestrial, aquatic, and/or airborne vehicle. In some embodiments, the vehicle system 200 is an autonomous vehicle that navigates its environment with limited human input or without human input. In some embodiments, the edge node may be an edge server that communicates with a plurality of vehicles in a region and communicates with another vehicle, such as the vehicle 102.

The vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth@, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1 GL, 2 GL, 3 GL, 4 GL, or 5 GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processors 202 along with the one or more memory modules 206 may operate as a controller for the vehicle system 200.

The one or more memory modules 206 includes geolocation feature based (GFB) module 207. The GFB module 207 may operate as a part of an advanced driver-assistance system (ADAS) which includes the perception model. The GFB module 207 may be a program module in the form of operating systems, application program modules, and other program modules stored in one or more memory modules 206. In some embodiments, the program module may be stored in a remote storage device that may communicate with the vehicle system 200, for example, in the edge system 240. Such a program module may include, but is not limited to, routines, subroutines, programs, objects, components, data structures, and the like for performing specific tasks or executing specific data types as will be described below.

The GFB module 207 determines geolocation-based features of an environment of the vehicle system 200 to determine the type of environment surrounding the vehicle system 200. A perception model for the vehicle 102 may then be updated based on the environment of the vehicle system 200. The perception model may be stored in the one or more memory modules 206 or included in the GFB module 207. The GFB module 207 receives information relating to geolocation-based features from one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate a vehicle.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain a rough depth and speed information for the view of the vehicle system 200.

For example, when the vehicle is driving along a coast line, the one or more sensors 208 may detect a large body of water nearby to the vehicle system 200. As the vehicle system 200 continues to travel along the coastline, the one or more sensors 208 may provide this information to the GFB module 207. The GFB module 207 may then determine to update the perception model of the vehicle system 200 to one associated with a coastline environment.

The vehicle system 200 further includes one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of a vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

The one or more vehicle sensors 212 may provide information to the GFB module 207 to detect and track objects in the perception model. In embodiments, the one or more sensors 208 co-operate with the one or more vehicle sensors 212 to detect and track geolocation-based features and to provide this information to the GFB module 207.

The vehicle system 200 further includes a satellite antenna 214 coupled to the communication path 204 such that the communication path 204 communicatively couples the satellite antenna 214 to other modules of the vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202. The vehicle system 200 may transmit the current location of the vehicle to the edge system 240, and the edge system 240 may determine a proper perception model for the vehicle based on the received location information.

Still referring to FIG. 2, the vehicle system 200 comprises network interface hardware 216 for communicatively coupling the vehicle system 200 to the edge system 240. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth@ wireless communication protocol. The network interface hardware 216 of the vehicle system 200 may transmit its data to the edge system 240. For example, the network interface hardware 216 of the vehicle system 200 may transmit messages such as BSMs, CPMs, PSMs to the edge system 240.

In embodiments, the vehicle system 200 may connect with one or more external vehicle systems and/or external processing devices (e.g., the edge system 240) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the vehicle system 200 may be communicatively coupled to the edge system 240 by the network 250. In one embodiment, the network 250 may include one or more computer networks (e.g., a personal area network, a local area network, or a wide area network), cellular networks, satellite networks and/or a global positioning system and combinations thereof. Accordingly, the vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth*, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the edge system 240 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The one or more memory modules 246 may include a GFB perception model module 247.

The GFB perception model module 247 determines geolocation-based features of the environment of the vehicle system 200 to determine the type of environment surrounding the vehicle system 200. The perception model for the vehicle 102 may then be updated based on the environment of the vehicle system 200. The GFB perception model module 247 receives information relating to geolocation-based features from one or more sensors 208 and/or the one or more vehicle sensors 212. In embodiments, the GFB perception model module 247 may co-operate with the GFB module 207 to detect and determine geolocation-based features surrounding the vehicle. This is advantageous as it expedites processing of the data received by the one or more sensors 208. In embodiments, GFB module 207 offloads determining the geolocation-based features to the GFB perception model module 247. This is advantageous where the one or more processors 202 have limited processing resources.

After determining the type of environment of the vehicle system 200, the GFB perception model module 247 may also make the determination whether to update the perception model. To make this determination, the GFB perception model module 247 uses the following equation:

$$w_1 \left( \sum_{i=1}^{Classes_{new\ region}} acc_i - \sum_{i=1}^{Classes_{current\ region \cap new\ region}} acc_i \right) - w_2(L_{new} - L_{current}) - w_3 * cost_{updating} \quad \text{Equation 1}$$

In Equation 1, weight parameters w1, w2, and w3 are predetermined values that provide a weight factor for each portion of the Equation 1. The weight parameters w1, w2, and w3 may be preset values and may be updated based on empirically collected data during operation of the vehicle system 200. The $Classes_{new\ region}$ is the number of object classes in the new region or a second area of which the vehicle system 200 is located. The $Classes_{current\ region}$ is the number of object classes in the current region or a first area of which the vehicle system 200 is located. The $acc_i$ is the perception precision of the i-th class object using the corresponding perception model. In other words, the $acc_i$ is associated with an accuracy of identifying a specific class object using a perception model trained for the new region or identifying a specific class object using a perception model trained for the current region. $\Sigma_{i=1}^{Classes_{new\ region}} acc_i$ represents a sum of accuracy of perceiving objects using a new perception model that is trained for the new region. $\Sigma_{i=1}^{Classes_{current\ region \cap new\ region}} acc_i$ represents a sum of accuracy of perceiving objects using a current perception model. For example, in the new region, there may be objects A, B, C, D, E, F, G, H, I, J to be perceived. The new perception model may perceive each of objects A, B, C, D, E, F, G, H, I, J with a certain accuracy. The current perception model may perceive only objects A, B, C, D, E. Then, the perception accuracy by the new perception model increases 100% as to objects F, G, H, I, J compared to the current perception model because the current perception model cannot perceive objects F, G, H, I, J. For objects A, B, C, D, E, the perception accuracy by the new perception model is compared with the perception accuracy by the current perception model. The $acc_i$ may be preset values and may be updated based on empirically collected data during operation of the vehicle system 200.

The $latency_{new}$ is the inference latency of processing an image of the new model. The $latency_{current}$ is the inference latency of processing an image of the current model. One factor in determining the latency of processing a model is based on the number of class objects.

The $cost_{updating}$ is the cost of the processor for updating the precision model based on the new environment. Factors that are considered include task delay, energy consumption, and other components of the vehicle system 200 that require processing. If after completing Equation 1, there is a positive gain (e.g., >0), the GFB perception model module 247 proceeds with updating the perception model based on the new region and transmits the new perception model to the vehicle. If after completing Equation 1, there is not a positive gain (e.g., ≤0), the GFB perception model module 247 may remain executing the current perception model and not transmit the new perception model to the vehicle. In embodiments, the GFB module 207 makes the determination as to whether to update the perception module.

Figure 3:
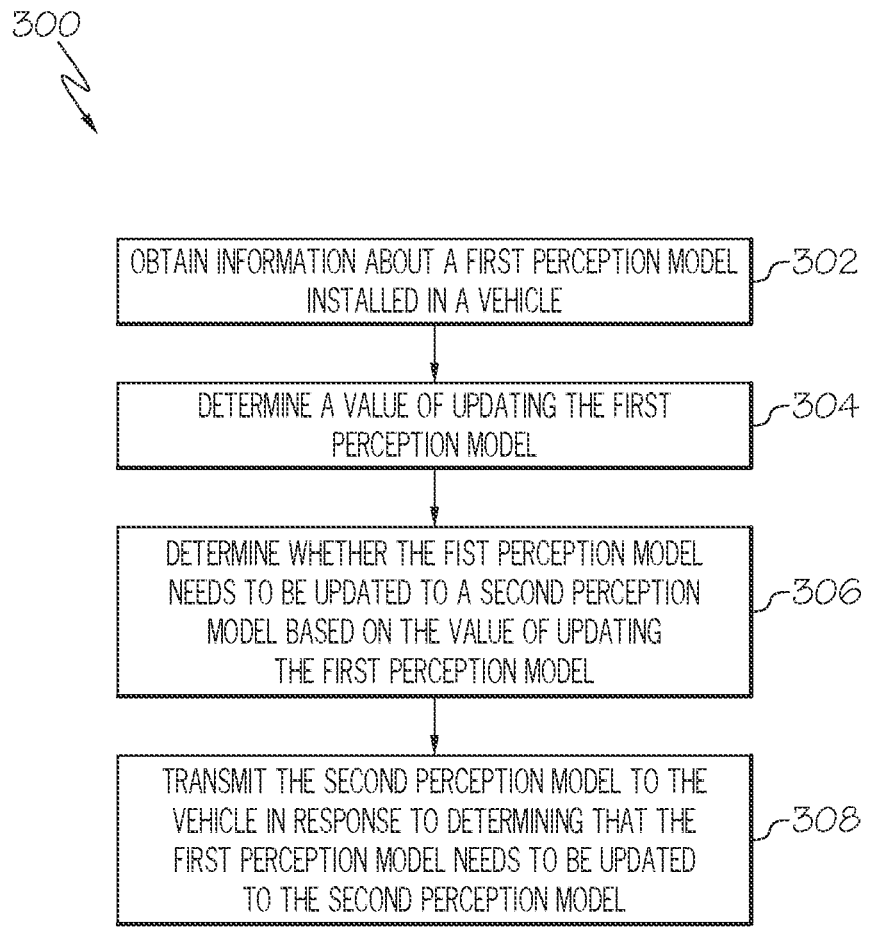
FIG. 3 depicts a flowchart for detecting an environment using geolocation-based features, according to one or more embodiments shown and described herein.

FIG. 3 depicts a flowchart for a method 300 for detecting an environment using geolocation-feature based perception, according to one or more embodiments shown and described herein. The method 300 may be performed by a server (e.g., such as the edge system 240 of FIG. 2 or the vehicle system 200 of FIG. 2). The server includes a controller (e.g., such as the one or more processors 202 of FIG. 2 or the one or more processors 242 of FIG. 2). The method 300 may be performed while the vehicle is stationary or while the vehicle is moving.

In step 302, the controller obtains information about a first perception model installed in a vehicle. The information may be collected during a certain duration of a trip of the vehicle and may include collecting geolocation-based features of the environment of the vehicle system. The vehicle system obtains this information from one or more sensors in the vehicle (e.g., as described in FIG. 2). As described in greater detail above, the one or more sensors may include visual and/or motion sensors within the vehicle. The first perception model may be used for detecting and tracking the objects in the current region of the vehicle and/or for updating the digital map presented to the driver of the vehicle.

In step 304, the controller may determine a value of updating the first perception model. The controller does so by determining an accuracy of using the first perception model on a new region in which the vehicle is located compared to a new perception model, or a second perception model. The environment of the vehicle is determined based on the information received by the vehicle associated with the geolocation-based features surrounding the vehicle. The controller may also utilize the number of objects in the current region which accurately detect objects in the new region. The controller may utilize a segment of Equation 1 to determine the value of updating the first perception model.

In step 306, the controller determines whether the first perception model needs to be updated to a second perception model based on the value of updating the first perception model performed in Step 304. The controller may determine that the second perception model is more accurate for the new region as compared to the first perception model. The controller may then utilize Equation 1, described in greater detail above, in determining whether to update the first perception model to the second perception model. The controller may consider the latency of processing the second perception model relative to the processing of the first perception model. The controller may also consider the cost of updating the perception model based on the required energy and possible task delays.

In step 308, the controller transmits the second perception model to the vehicle in response to determining that the first perception model needs to be updated to the second perception model. In embodiments, the controller transmits the second perception model via a network (e.g., such as the edge system 240). In embodiments, the controller is positioned in the vehicle and transmits the second perception model to the vehicle via a communication path (e.g., such as communication path 204).

Figure 4:
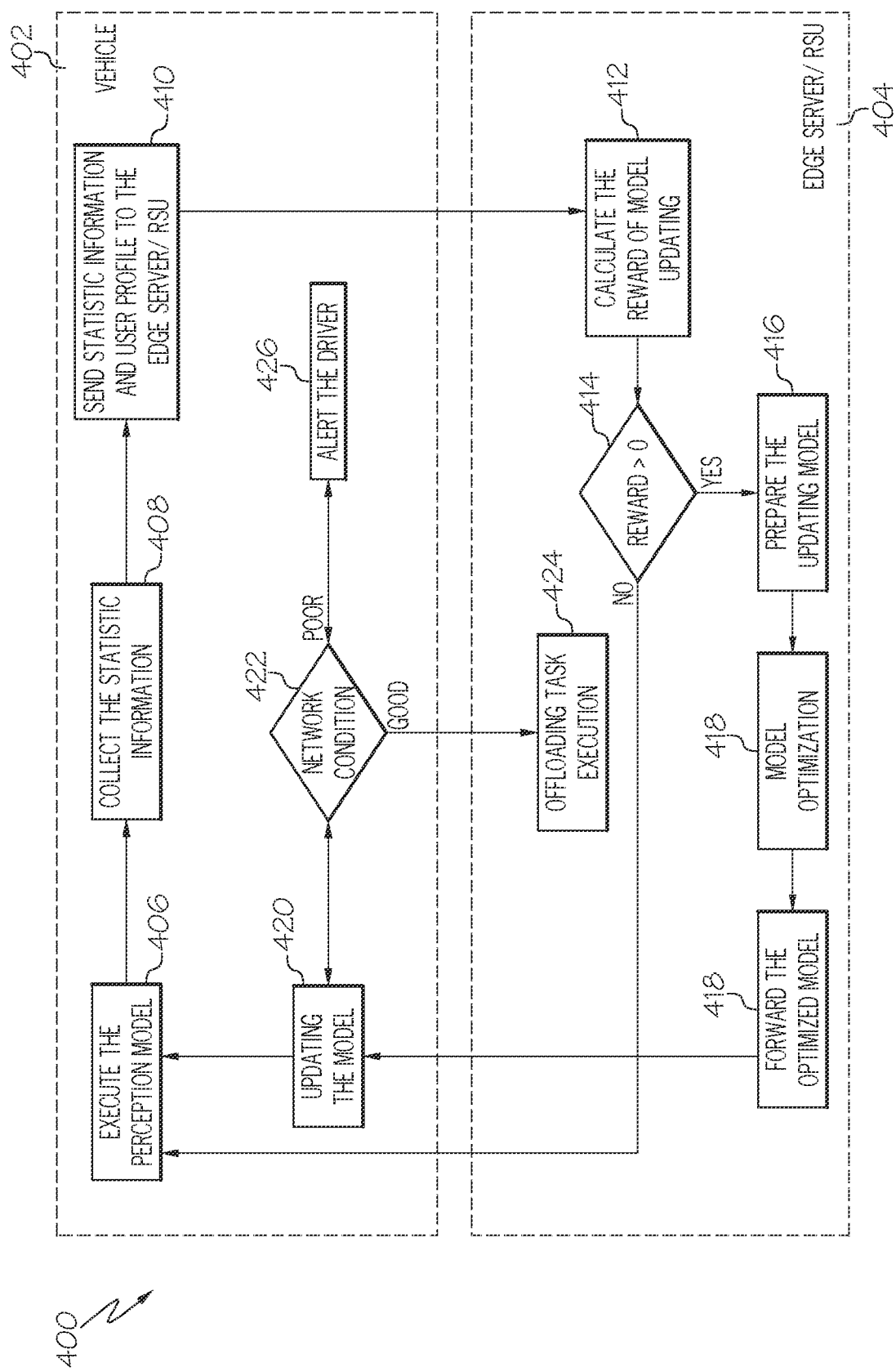
FIG. 4 depicts a decision flowchart for implementing a perception model based on geolocation-based features, according to one or more embodiments shown and described herein.

FIG. 4 depicts a decision flowchart 400 for implementing a perception model based on geolocation-based features, according to one or more embodiments shown and described herein.

The flowchart 400 includes a vehicle 402 and an edge server 404. The vehicle 402 may be substantially similar to the vehicle system 200 and the edge server 404 may be substantially similar to the edge system 240. In embodiments, the edge server 404 may be a roadside unit (RSU). The RSU is a transceiver mounted along a road or pedestrian passageway that is communicatively coupled to the vehicle 402. In step 406, the vehicle 402 executes a perception model. As discussed in greater detail above, the perception model is utilized in the vehicle's object classification and/or updating a digital map presented to the driver during operation of the vehicle 402.

In step 408, the vehicle 402 may collect statistic information. The statistic information may include information received from the one or more sensors described in greater detail above. The one or more sensors may include imaging sensors and/or motion detection sensors. In step 410, the vehicle 402 may then send the statistic information and user profile information (e.g., driver preferences, vehicle type) to the edge server 404. The vehicle 402 may provide the information via a network (e.g., such as network 250). In embodiments where the edge server 404 is positioned in the vehicle 402, the vehicle 402 sends the information to the edge server 404 via a communication path.

In step 412, the edge server 404 calculates a reward of updating the perception model. The edge server 404 may utilize Equation 1 described in greater detail above to calculate the reward. In step 414, if the reward does not equal or exceed a preset threshold, the flowchart 400 reverts back to step 406. After a specified period, the flowchart 400 may be repeated. In step 414, if the reward does equal or exceed a preset threshold, the flowchart 400 proceeds to step 416. In step 416, the edge server 404 prepares an updated model for the perception model. As discussed in greater detail above, the updated model may be based on a change in environment of the vehicle 402 (e.g., geolocation information, weather information, time information, natural disaster information, traffic information).

In step 418, the edge server optimizes the perception model. As discussed in greater detail above, optimization may be determined on the network signal between the vehicle 402 and the edge server 404, the processing capabilities of the vehicle 402, and/or user preferences. In step 418, the edge server forwards the optimized model to the vehicle 402.

In step 420, the vehicle 402 begins to update the model from the current perception model to the optimized model. While updating the perception model, the vehicle determines a network condition between the vehicle 402 and the edge server 404, in step 422. If the network condition is good (e.g., a strong connection), the vehicle 402 offloads (e.g., hands off processing) to the edge server 404. This is advantageous as it frees the processing resources of the vehicle 402. In embodiments, the edge server 404 and the vehicle 402 may update the model in parallel. This is advantageous as it expedites the processing of updating the model.

If the network condition is poor (e.g., there is a weak signal between the vehicle 402 and the edge server 404), the vehicle alerts the driver in step 426. In embodiments, the driver is notified that the perception model is no longer applicable for the current environment and instructs the driver to either pull over or take over control of the vehicle.

In embodiments, the driver is instructed to establish a stronger connection between the edge server 404 and the vehicle 402. In embodiments, the vehicle 402 cautions the driver that the perception model is no longer applicable for the current environment and that more cautioned driving is required by the driver.

Figure 5:
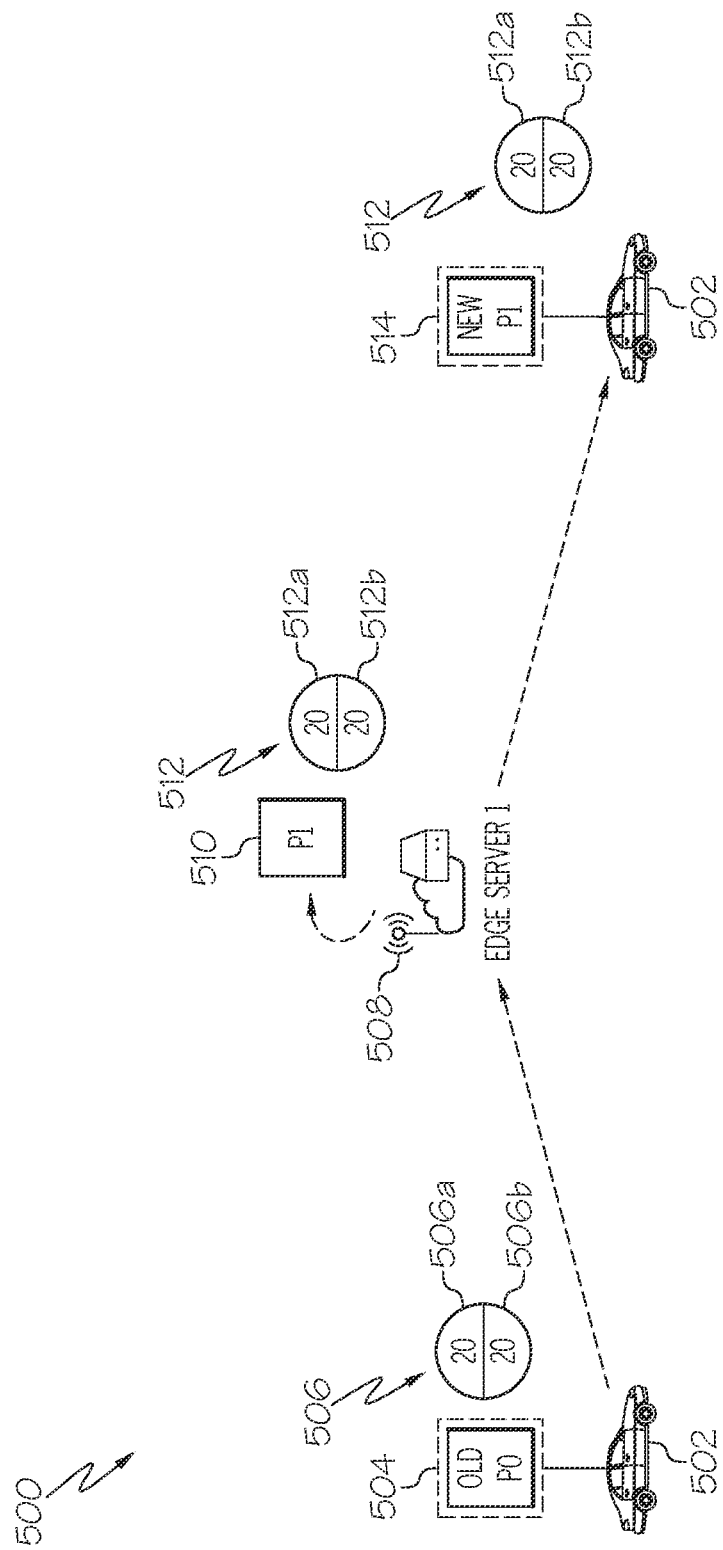
FIG. 5 schematically depicts a system for implementing updating a perception model, according to one or more embodiments shown and described herein.

FIG. 5 schematically depicts a system 500 for implementing updating a perception model, according to one or more embodiments shown and described herein.

In the system 500, the vehicle 502 (e.g., which may be substantially similar to vehicle 102), utilizes a first perception model 504. The first perception model 504 is based on an environment of the vehicle. The first perception model 504 includes object classes 506 associated with the current environment of the vehicle. The object classes 506 is used to detect objects in the vicinity of the vehicle 502. For example, the first perception model 504 that is able to perceive the object classes 506 may detect pedestrians. If the first perception model 504 detects a pedestrian and determines a collision may occur between the vehicle 502 and the pedestrian, features of the vehicle 502 may alert the driver and/or automatically control the vehicle 502, thereby mitigating the chance of a collision occurring.

The object classes 506 may include a general subclass 506a and an environment specific subclass 506b. The general subclass 506a may include objects that are used generally across all environments. For example, the general subclass 506a may include pedestrians, road signs, vehicles, and the like. Accordingly, the general subclass 506a may be included in all perception models. As depicted in FIG. 5, the general subclass 506a includes 20 objects that are used throughout the varying perception models.

The environment specific subclass 506b may include objects specific to the current region in which the vehicle 502 is located in. For example, if the vehicle 502 is in a city environment, the environment specific subclass 506b may include buildings, bicycles, potted plants, and the like.

The vehicle 502 is communicatively coupled to an edge server 508, which may be substantially similar to the first edge server 108 and the second edge server 116. As the vehicle 502 continues to travel, it may enter a new region. One or more sensors located on the vehicle 502 detect that the vehicle 502 is in a new location by tracking the geolocation-based features associated with that environment. For example, if the one or more sensors detect a fenced cow at the side of the road, the vehicle 502 may determine that the first perception model 504 may need to be updated to a countryside environment.

As discussed in greater detail above, the edge server 508 begins preparing an updated model 510, and optimizing the updated model 510 to be transmitted to the vehicle 502. The updated model 510 may be pre-stored in the edge server 508. The updated model 510 may include object classes 512 used to detect objects in a certain area (e.g., countryside). The object classes 512 include a general subclass 512a and an updated environment specific subclass 512b. The general subclass 512a may be substantially similar to the general subclass 506a. The environment specific subclass 512b may include objects specific to the new region in which the vehicle 502 is now located in. For example, the updated environment specific subclass 512b may include horses, bears, cows, and the like.

The edge server 508 may then begin providing the updated model 510 to the vehicle 502. The vehicle 502 may receive the updated model 510 as a second perception model 514. In embodiments, the second perception model 514 may be identical to the updated model 510. In embodiments, the second perception model 514 is a compressed version of the updated model 510. In embodiments, the second perception model 514 may be a tuned version of the updated model 510 to further include the type of vehicle 502 and/or computational power available for the vehicle 502. The second perception model 514 also includes the updated object classes 512 with the general subclass 512a and an updated environment specific subclass 512b. In this way, the perception model of the vehicle 502 may be updated in a timely and accurate manner.

Figure 6:
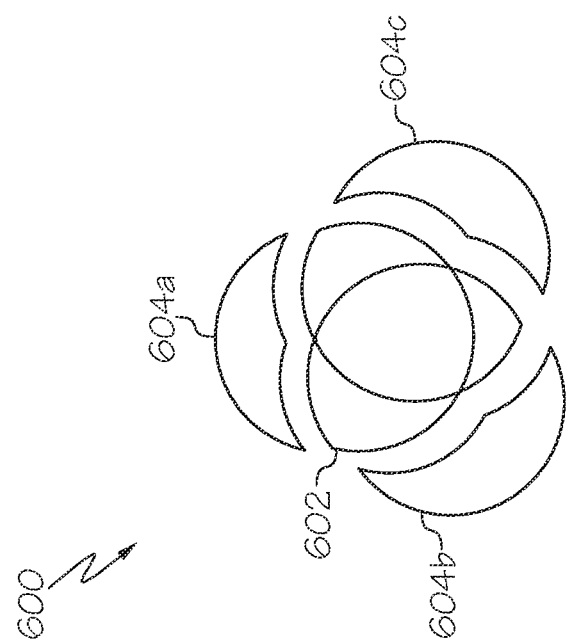
FIG. 6 schematically depicts object classes utilized by a perception model, according to one or more embodiments shown and described herein.

FIG. 6 schematically depicts object classes 600 utilized by a perception model, according to one or more embodiments shown and described herein.

The number of objects in the object classes 600 utilized by a perception model may impact a performance of the perception model. In conventional systems, object classes having less object classes require frequent perception model updates, thereby causing additional operational costs (e.g., energy, processing time). In the present disclosure, the object classes 600 include a general object classes 602. The general object classes 602 may be used to detect the most frequently used and/or the most prioritized object classes irrespective of an environment of the vehicle. For example, the general object classes 602 may continue to detect for pedestrians in a desert environment, even if pedestrians are much less common to appear in the desert environment.

The object classes 600 further includes geolocation-based object classes 604a, 604b, and 604c. Each of geolocation-based object classes 604a, 604b, and 604c include objects specific to an environment. For example, when the object class 604a is associated with a desert environment, the object class 604a includes detecting for objects that commonly occur in deserts, such as snakes, tumbleweeds, and the like. Accordingly, when the object class 604b is associated with a city environment, it will not detect for snakes, tumbleweeds, or the like as they are not common in the city environment. In this way, the frequency of updating the perception model is reduced, while also providing improved performance of the perception model.

Figure 7:
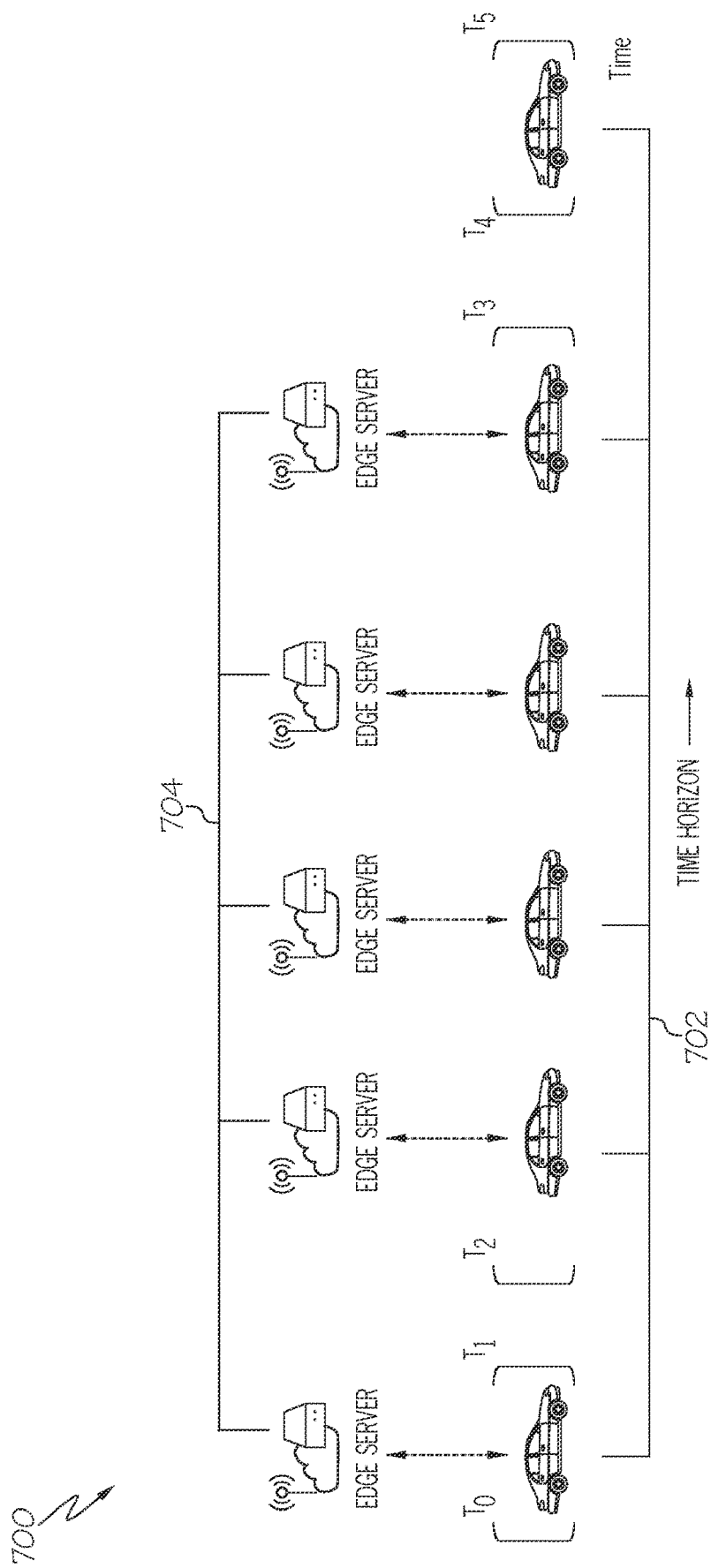
FIG. 7 schematically depicts another system for updating a perception model, according to one or more embodiments shown and described herein.

FIG. 7 schematically depicts another system 700 for updating a perception model, according to one or more embodiments shown and described herein.

A vehicle 702 is communicatively coupled to an edge server 704 that is substantially similar to the edge system 240 described above. In conventional approaches, updating a perception model may result in degraded performance when executing the current perception model and/or degraded performance of other autonomous features executed by a processor of the vehicle 702. The present disclosure describes a method of task offloading the preparation and optimization of the updated perception model by the edge server 704. Accordingly, the vehicle 702 may be prompted to update the perception model based on a change in environment of the vehicle 702.

At a first time internal $T_0$ through $T_1$, the vehicle 702 begins downloading the updated perception model from the edge server 704. The vehicle 702 may finish downloading the updated perception model or proceed to the next step while downloading the updated perception model. During a second time interval $T_2$ through $T_3$, the vehicle 702 determines if there is a strong connection to the edge server 704.

If the connection is poor (e.g., poor connection), the vehicle 702 may prompt the driver to take control of the vehicle 702 and/or to park the vehicle until the updating may be completed. In these situations, the vehicle 702 may update the perception model and/or process in parallel with the edge server 704.

If the connection is strong between the edge server 704 and the vehicle 702, the vehicle 702 may offload perception tasks to the edge server. Because the vehicle 702 cannot use a local perception model while the perception model is updated, the vehicle 702 offload perception tasks to the edge server. Specifically, the vehicle 702 may transmit captured images to the edge server 704, and the edge server 704 may analyze the captured images using a perception model stored in the edge server and transmit perception analysis results to the vehicle 702. The vehicle 702 may operate based on the received perception analysis results.

During a third time interval $T_4$ through $T_5$, the edge server 704 has completed updating the model and is currently being executed by the vehicle 702.

From the above, it is to be appreciated that defined herein systems and methods for detecting an environment and then updating a perception model for vehicle based on the environment. Updating perception models may be limited by the computational resources of the vehicle. Conventional systems may compress advanced perception models for the vehicle, which may cause degradation of the perception models. Accordingly, it is often required for perception models to be updated based on varying scenarios for the vehicle. Additionally, vehicles are constantly changing their location which may cause updating to be limited by the vehicle's network connectivity. These problems may result in concerns, such as poor object detection. The present disclosure analyzes geolocation-based features of the vehicle's environment to determine an appropriate perception model. This results in providing the vehicle an accurate perception model in a timely manner.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A server comprising:
    a controller programmed to:
        obtain information about a first perception model installed in a vehicle moving from a first region to a second region;
        determine a value of updating the first perception model;
        determine whether the first perception model needs to be updated to a second perception model based on the value of updating the first perception model; and
        transmit the second perception model to the vehicle in response to determining that the first perception model needs to be updated to the second perception model,
    wherein the first perception model is pre-trained with geolocation-based features related to the first region,
    wherein the second perception model is pre-trained with geolocation-based features related to the second region, and
    wherein the value of updating the first perception model is determined based on difference between accuracy of identifying objects in the second region using the second perception model and accuracy of identifying the objects in the second region using the first perception model.

2. The server of claim 1, wherein the value of updating the first perception model is determined further based on difference between processing time of an image using the second perception model and processing time of the image using the first perception model.

3. The server of claim 2, wherein the value of updating the first perception model is determined further based on a cost of updating to the first perception model.

4. The server of claim 1, wherein the first perception model detects a set of objects different from a set of objects detected by the second perception model.

5. The server of claim 1, wherein the second perception model is pre-trained with geolocation-based features related to a new region.

6. The server of claim 1, wherein the controller is further programmed to:
    obtain a user profile of the vehicle; and
    optimize the second perception model based on the user profile.

7. The server of claim 1, wherein the controller is further programmed to update the second perception model based on at least one of time information, weather information, traffic incident information, and natural disaster information.

8. A method performed by a controller comprising:
    obtaining information about a first perception model installed in a vehicle moving from a first region to a second region;
    determining a value of updating the first perception model;
    determining whether the first perception model needs to be updated to a second perception model based on the value of updating the first perception model; and
    transmitting the second perception model to the vehicle in response to determining that the first perception model needs to be updated to the second perception model,
    wherein the first perception model is pre-trained with geolocation-based features related to the first region,
    wherein the second perception model is pre-trained with geolocation-based features related to the second region, and
    wherein the value of updating the first perception model is determined based on difference between accuracy of identifying objects in the second region using the second perception model and accuracy of identifying the objects in the second region using the first perception model.

9. The method of claim 8, wherein the value of updating the first perception model is determined further based on difference between processing time of an image using the second perception model and processing time of the image using the first perception model.

10. The method of claim 9, wherein the value of updating the first perception model is determined further based on a cost of updating to the first perception model.

11. The method of claim 8, wherein the first perception model detects a set of objects different from a set of objects detected by the second perception model.

12. The method of claim 8, wherein the second perception model is pre-trained with geolocation-based features related to a new region.

13. A vehicle comprising:
a controller programmed to:
  collect information about a first perception model of the vehicle moving from a first region to a second region;
  transmit the information about the first perception model to a server;
  receive a second perception model generated based on a value of updating the first perception model; and
  update the first perception model to the second perception model,
wherein the controller is programmed to offload a perception task to the server while updating the first perception model to the second perception model,
wherein the first perception model is pre-trained with geolocation-based features related to the first region,
wherein the second perception model is pre-trained with geolocation-based features related to the second region, and
wherein the value of updating the first perception model is determined based on difference between accuracy of identifying objects in the second region using the second perception model and accuracy of identifying the objects in the second region using the first perception model.

14. The vehicle of claim 10, wherein the value of updating the first perception model is determined further based on difference between processing time of an image using the second perception model and processing time of the image using the first perception model.

15. The vehicle of claim 14, wherein the value of updating the first perception model is determined further based on a cost of updating to the first perception model.

16. The vehicle of claim 13, wherein the first perception model detects a set of objects different from a set of objects detected by the second perception model.

* * * * *